(No Model.) 2 Sheets—Sheet 1.

C. W. HUNT.
DRIVING MECHANISM FOR CAR TRUCKS.

No. 447,114. Patented Feb. 24, 1891.

Witnesses:
J. Staib
Chas H. Smith

Inventor
Charles W. Hunt
per Lemuel W. Serrell
atty.

(No Model.) 2 Sheets—Sheet 2.

C. W. HUNT.
DRIVING MECHANISM FOR CAR TRUCKS.

No. 447,114. Patented Feb. 24, 1891.

Witnesses:
J. Stait
Chas H Smith

Inventor:
Charles W. Hunt
per Lemuel W. Serrell atty.

UNITED STATES PATENT OFFICE.

CHARLES W. HUNT, OF WEST NEW BRIGHTON, NEW YORK.

DRIVING MECHANISM FOR CAR-TRUCKS.

SPECIFICATION forming part of Letters Patent No. 447,114, dated February 24, 1891.

Application filed October 31, 1890. Serial No. 369,947. (No model.)

*To all whom it may concern:*

Be it known that I, CHARLES W. HUNT, a citizen of the United States, residing at West New Brighton, in the county of Richmond and State of New York, have invented an Improvement in Driving Mechanism for Car-Trucks, of which the following is a specification.

Electric and other motors have been made use of upon cars for rotating the wheels of the same; but usually such motor has been placed directly upon the truck or upon a frame supported by the axles, in order that difficulty may not arise in turning curves or in cases where the truck swings upon the king-bolt.

My present invention is made for connecting the motive power to the truck-wheels in such a manner that the motive power may be supported upon the body of the car and the truck may be free to swing more or less upon its axis or king-bolt without interfering with the proper connection from the motive power to the wheels upon the track.

Figure 1:
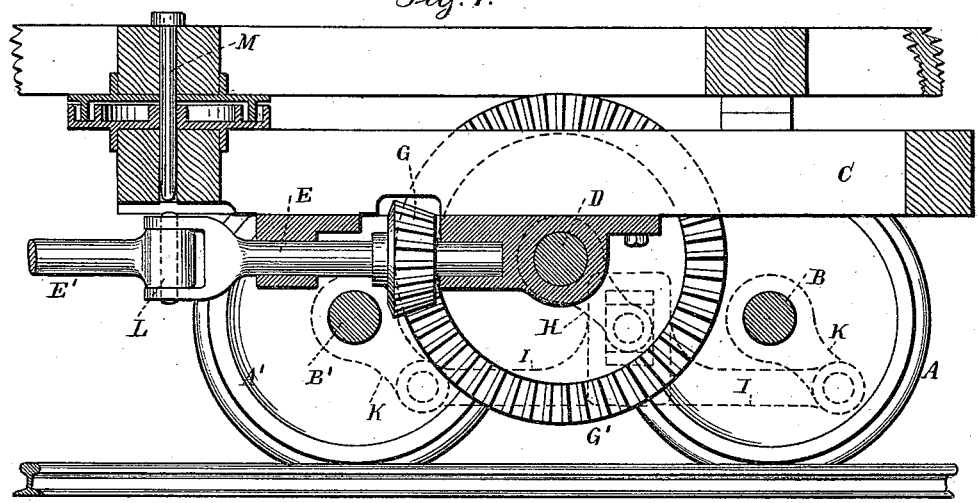
Figure 2:
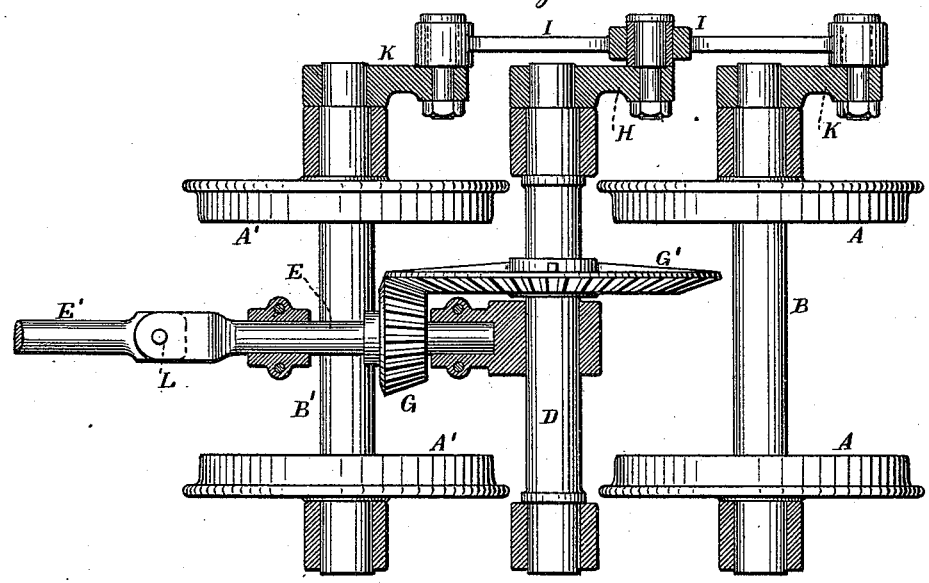
Figure 3:
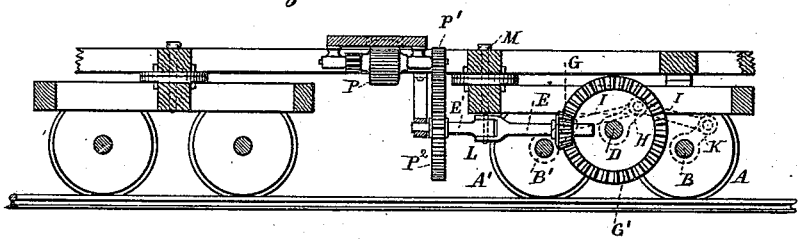
Figure 4:
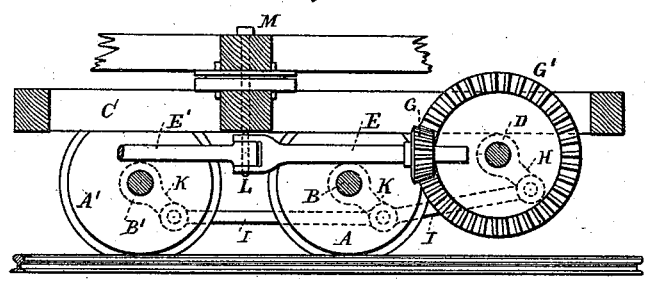
Figure 4:
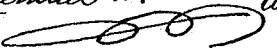

In the drawings, Figure 1 is an elevation of the gearing made use of by me and a section of the axles and supporting-frame, and Fig. 2 is a diagrammatic plan view illustrating the mode of connecting the motive power to the axles. Fig. 3 is a partial sectional view showing two trucks and an electric motor, and Fig. 4 is a modification of the connection to the cranks.

The car-wheels A A' are upon axles B B', and such wheels and axles are of any desired character, and the truck-frame C receives the axle-boxes of the axles B B', and such axle-boxes may be of any desired character, and I make use of a cross-shaft D, which is parallel to the axles B B', but in a higher plane, in order that the driving-shaft may be in the same plane as the axle D, but above the axle B'. Hence such driving-shaft E may cross the axle B' freely, and by a bevel-pinion G and bevel-gear G' upon the cross-shaft D such cross-shaft D is rotated, and there are upon one or both ends of the cross-shaft D cranks H and connecting-rods I to cranks K upon the shafts B and B'; and the connecting-rods I may be separate, having link joints at the cranks H; or such connecting-rod I may extend from one crank K to the other and be provided with a journal-box for the reception of the crank H, which journal-box may be free to slide in a vertical slot in the connecting-rod I, so as to allow for the motion resulting from the cross-shaft D being supported by the truck-frame or the axle-box rising and falling upon the axles B B'.

In the driving-shaft E there is a universal joint L, and this joint is immediately below the king-bolt M, upon which the truck-frame C swivels, in order that the two parts E and E' of the driving-shaft may assume a more or less angular position when the truck swings in passing a curve, and this movement is allowed of without any derangement of the motor and the gearing, because the distance between the motor and the gear G is the same whether the parts of the driving-shaft are in line with each other or at an angle, and I remark that where a six or eight wheel truck is made use of the universal joint L can be placed under the center of the truck, or in case of a four-wheel truck the cross-shaft D may be at one end thereof, as illustrated in the diagram Fig. 4, in order that the universal joint L may come central and beneath the king-bolt of the car, and in cases where the truck-frame and truck swing laterally from a king-bolt near one end of the truck-frame the king-bolt will occupy the position indicated in Figs. 1 and 3.

An electric motor is illustrated at P, Fig. 3, and the pinion P' on the armature-shaft gears into the wheel P² on the shaft E'.

I claim as my invention—

1. The combination, with the truck-wheels, axles, and frame, of a cross-shaft upon the truck-frame, parallel to but in a higher plane than the axles of the wheels, crank connections for giving motion from the cross-shaft to the axles and wheels, a horizontal driving-shaft passing across and above one of the axles, and gearing for connecting the driving-shaft and the cross-shaft, substantially as set forth.

2. The combination, with the car-wheels, axles, and truck-frame, of the cross-shaft parallel to but in a higher plane than the axles, cranks and connections between the cross-shaft and the axles, a driving-shaft in line with the cross-shaft and passing above one of the axles, gearing for connecting the driving-shaft and the cross-shaft, and a universal joint in the driving-shaft beneath and in line with the king-bolt of the truck, substantially as set forth.

3. The combination, with the car-wheels, axles, and truck-frame, of a cross-shaft at one end of the truck-frame, parallel to and higher than the axles, cranks and connections to the axles, a longitudinal driving-shaft passing above the axles and provided with a universal joint in line with the king-bolt of the truck, and gearing between the driving-shaft and cross-shaft, substantially as set forth.

4. The combination, with the car-body truck and king-bolt, of a motor connected to the car-body, a shaft driven by the motor, gearing from said shaft to the car-wheels, and a universal joint in the shaft and in line with the king-bolt, substantially as specified.

Signed by me this 28th day of October, 1890.

CHAS. W. HUNT.

Witnesses:
GEO. T. PINCKNEY,
WILLIAM G. MOTT.